(12) United States Patent
Sawada

(10) Patent No.: US 6,181,437 B1
(45) Date of Patent: Jan. 30, 2001

(54) IMAGE PROCESSING APPARATUS CAPABLE OF PRODUCING IMAGES WITHOUT JAGGIES AT EDGES

(75) Inventor: Kenichi Sawada, Toyohashi (JP)

(73) Assignee: Minolta Co., Ltd., Osaka (JP)

( * ) Notice: Under 35 U.S.C. 154(b), the term of this patent shall be extended for 0 days.

(21) Appl. No.: 08/891,942

(22) Filed: Jul. 14, 1997

(30) Foreign Application Priority Data

Jul. 17, 1996 (JP) .................................................. 8-187191
Sep. 17, 1996 (JP) .................................................. 8-244694

(51) Int. Cl.[7] .............................. G06T 5/50; G06K 9/46
(52) U.S. Cl. .......................... 358/1.9; 382/269; 382/271; 382/194
(58) Field of Search .............................. 395/109; 382/266, 382/267, 269, 271, 274, 264, 192, 194, 199, 254, 258; 358/462, 447, 296, 1.9

(56) References Cited

U.S. PATENT DOCUMENTS 5,351,315  9/1994  Ueda et al. ........................... 382/266
5,450,208  9/1995  Murata .................................. 358/296
5,835,614  * 11/1998  Aoyama et al. ...................... 382/199

FOREIGN PATENT DOCUMENTS 7-193717  7/1995  (JP) .

* cited by examiner

Primary Examiner—Scott Rogers
(74) Attorney, Agent, or Firm—Sidley & Austin

(57) ABSTRACT

Image data for continuous three pixels delayed by one pixel from each other is input in row and column directions from an image input portion into a scanning window. A predetermined image pattern is stored in a count value comparison table for detecting a target pixel on an image contour, and a determining portion performs determination relating to the predetermined image pattern and the input image data. Based on the result of determination by the determining portion, an intensity converter portion performs conversion of intensity data such that the target pixel becomes black when the target pixel is present on the image contour, and that the target pixel becomes white in other cases. As a result, an image processing apparatus can output a smooth contour image without jaggies regardless of an input image intensity.

30 Claims, 19 Drawing Sheets

FIG. 4

| 0 | 0 | 0 | 0 | 0 | → n10=5 |
| 0 | 50 | 60 | 0 | 0 | → n20=3 |
| 160 | 170 | 180 | 170 | 160 | → n30=0 |
| 60 | 70 | 40 | 20 | 0 | → n40=1 |
| 0 | 20 | 0 | 0 | 0 | → n50=4 |

| 0 | 0 | 0 | 0 | 0 | → n10=5 |
| 0 | 50 | 60 | 0 | 0 | → n20=3 |
| 160 | 170 | 180 | 170 | 160 | → n30=0 |
| 60 | 70 | 40 | 20 | 0 | → n40=1 |
| 0 | 20 | 0 | 0 | 0 | → n50=4 |

↓ ↓ ↓ ↓ ↓
n01=3  n02=1  n03=2  n04=3  n05=4 n10=*
n20=W
n30=B
n40=W
n50=* n10=*
n20=W
n30=B
n40=B
n50=W n10=W
n20=B
n30=B
n40=W
n50=* n10=*
n20=W
n30=B
n40=B
n50=B n10=B
n20=B
n30=B
n40=W
n50=*

AFTER PROCESSING

BEFORE EDGE
ENHANCEMENT

AFTER EDGE
ENHANCEMENT

IMAGE PROCESSING APPARATUS CAPABLE OF PRODUCING IMAGES WITHOUT JAGGIES AT EDGES

BACKGROUND OF THE INVENTION

Field of the Invention

The present invention relates to an image processing apparatus, and in particular to an image correction processing apparatus which corrects intensities at edges of a multilevel thin line image for producing an image without jaggies at edges caused by multilevel-to-binary conversion.

DESCRIPTION OF THE BACKGROUND ART

Description of the Related Art

Generally, in image output apparatuses such as a copying machine, a facsimile and a printer, image data processing is performed for preparing output data by converting multilevel image data, which is supplied from a reading device or the like, into binary data. Various types of binary output methods have been proposed for achieving a higher image quality. However, any of them cannot perform multilevel-to-binary conversion without a problem that jaggies at edges or interruptions occur at characters or images formed of thin lines or the like, and therefore sharpness is impaired. In the prior art, a high-frequency enhancing filter such as a Laplacian filter has been used for reproducing sharp images. Also, a degree of enhancing an intensity of edge is controlled to prevent the interruptions and jaggies.

In a conventional image output device, a contrast of an edge is enhanced by enhancing the edge so as to increase the gradient of intensity change between a character and a background. However, edge enhancement by a Laplacian filter has the characteristic that an amplification rate increases with an increase in frequency of image data to be processed, so that the enhancement is strongly performed on line images and isolated points. Therefore, when a line image is read by a general image reading device using a photoelectric conversion element such as a CCD, the line image itself can be read at a high resolution owing to the edge enhancement processing. However, an isolated point and low-intensity image located near the line image are also enhanced, so that jaggies occurs at the line image when multilevel-to-binary conversion is performed. If an edge detecting level is lowered for preventing jaggies, even a weak image slant portion other than the line image is determined as an edge, resulting in increase in image noises.

FIGS. 21A and 21B are diagrams showing distributions of an intensity of an image edge before and after edge enhancement in the prior art. The change in intensity of the edge-enhanced image, which is determined in the edge line or longitudinal direction and shown in FIG. 21B, is larger than that before edge-enhancement shown in FIG. 21A. As a result, conspicuous jaggies appear at line images after the multilevel-to-binary conversion.

Further, according to a method in which intensity change is extracted by differentiation with a Laplacian filter, an interior of an image cannot be detected because a change in intensity is not present at the interior, although an edge of the image can be detected. As a result, scanning for each pixel is performed independently of surrounding pixels according to the method using the Laplacian filter, so that two-dimensional (planar) characteristics of the image cannot be acquired.

SUMMARY OF THE INVENTION

Accordingly, it is an object of the invention to provide an image processing apparatus which can output a smooth contour image without jaggies independently of an intensity of an input image.

Another object of the invention is to provide an image processing apparatus which can output a contour image of a high quality.

Still another object of the invention is to provide an image processing apparatus which can produce an image without jaggies caused by multilevel-to-binary conversion.

Yet another object of the invention is to provide an image processing apparatus in which jaggies at a line image are surely prevented.

A further object of the invention is to provide an image processing apparatus which can remove isolated points.

For achieving the above objects, the invention provides an image processing apparatus including the following components. The image processing apparatus according to the invention includes: an edge determining device for determining whether a predetermined target pixel is present at an image edge or not, and an intensity converter for converting an intensity of the target pixel into a predetermined intensity based on the result of the determination.

When the target pixel is not present at the edge of the image, an edge portion of the image portion and an image interior other than the edge are detected independently of each other for converting the target pixel into a pixel of a predetermined intensity. When the edge is located at the image interior, the intensity is converted into that of the pixel of the predetermined intensity representing the image interior. Since the conversion of the intensity is performed taking surrounding pixels around each pixel into consideration, the two-dimensional characteristics of the image are acquired. Independently of the intensity of the input image, a smooth contour image without jaggies can be output.

According to another aspect, an image processing apparatus includes: an input device for inputting image data; an image data take-in device for taking in the input data in row and column directions; a counting device for counting the numbers of predetermined pixels in the taken data individually in rows and columns; a count value setting device for setting predetermined count values for the row and the column; a count value comparator for comparing the result of counting by the counting device with the set value of the count value setting device; and a converter for performing conversion of pixel data in the rows and columns based on the result of comparison by the count value comparator.

In the image processing device, the input image data is continuously taken into a scanning window in the row and column directions, and the number of the pixels having intensities in a predetermined range are counted in the row and column directions. Then, a comparison is made with a preset count value table for determining whether a predetermined target pixel is on an image edge. Conversion of the input image data is performed in accordance with the result of the comparison. Since conversion of the intensity of the input image data is performed depending on whether the target pixel is on the image edge or not, the contour image having a high quality can be output.

According to still another aspect of the invention, an image processing apparatus includes: an edge determining device for determining whether a predetermined target pixel is present on an image edge of a line image or not; and an intensity converter for converting an intensity of the target pixel into a predetermined intensity based on the result of determination.

Since the intensity for the target pixel is converted into the predetermined intensity value when it is determined that the edge of the line image contains the target pixel, the edge intensity can be uniform. As a result, it is possible to produce an image without jaggies at its edge caused by multilevel-to-binary conversion.

According to a further aspect of the invention, an image processing apparatus includes: a scanning window for inputting image data containing a target pixel in row and column directions; an image data take-in device for taking the image data into a scanning window in the row and column directions; a counting device for counting the numbers of predetermined pixels in the rows and the columns of the taken data; a line image determining device for determining, based on the result of counting, whether the pixel data in the scanning window forms a line image or not; and a converter for converting intensity data of the pixel data of the target pixel into a predetermined intensity based on the result of the determination by the line image determining device.

According to the apparatus of the above aspect, the successively received image data is taken into the scanning window in a matrix form. In the row and column directions, the number of the pixels of the predetermined intensity value are counted per line. Based on the count value, it is determined whether a line image is formed at the image edge or not. When it is determined that the line image is formed, the intensity of the target pixel is converted into the predetermined intensity value. Thus, the scanning window having a matrix form is used for determining whether the line image is formed or not. Therefore, the determination of the line image can be performed surely. If the line image is formed, the target pixel intensity is converted into the predetermined intensity value, so that the edge intensity can be uniform. As a result, jaggies at the line image can be surely prevented.

The apparatus of the above aspect may include an average intensity value calculating device for calculating an average intensity value from intensity values of the pixels forming the line image in the scanning window, in which case the intensity value converter uses the average intensity value as the predetermined intensity value.

According to a further aspect of the invention, an image processing apparatus includes: a scanning window for inputting pixel data containing a target pixel in row and column directions; an image data take-in device for taking the pixel data into a scanning window in the row and column directions; a counting device for counting the number of predetermined pixels in the rows and the columns of the taken data; a line image determining device for determining, based on the result of counting, whether the pixel data in the scanning window forms a line image or not; an isolated pixel determining device for determining whether the target pixel is an isolated pixel or not; and a converter for converting intensity data of the image data of the target pixel into a predetermined line image intensity when the target pixel is contained in the line image according to the result of the determination by the line image determining device, and converting the intensity data of the image data of the target pixel into a predetermined isolated point intensity when the target pixel is the isolated point according to the result of the determination by the isolated point pixel determining device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows image data taken into the scanning window;

FIG. 5 shows a line image to be detected;

DESCRIPTION OF THE PREFERRED EMBODIMENTS

(1) First Embodiment

Figure 1B:
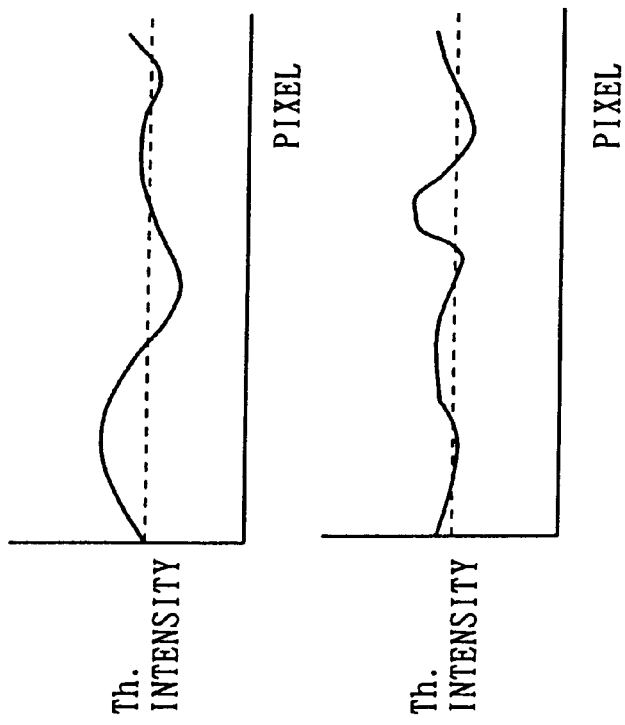
FIGS. 1A and 1B are diagrams showing intensity distributions of line images read by an image reading device and subjected to edge enhancement processing such as an MTF (Modulation Transfer Function)
Figure 1A:
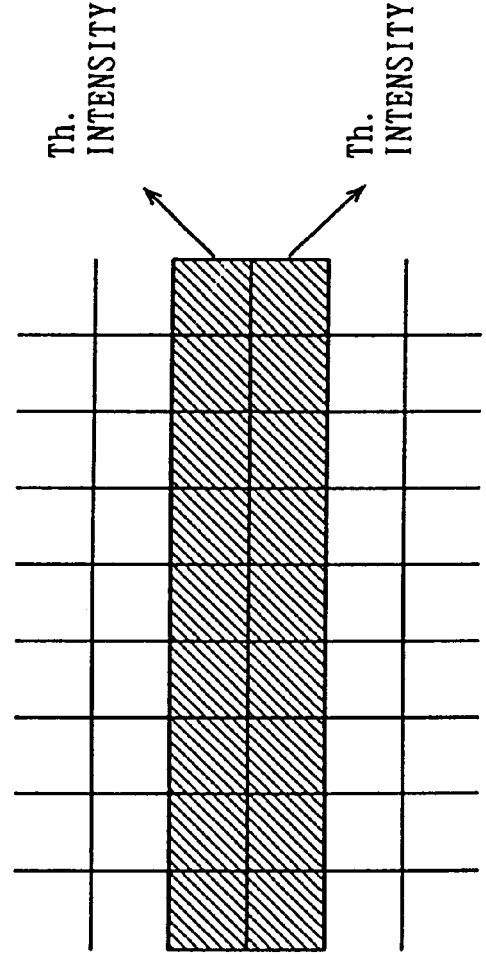
Figure 18:
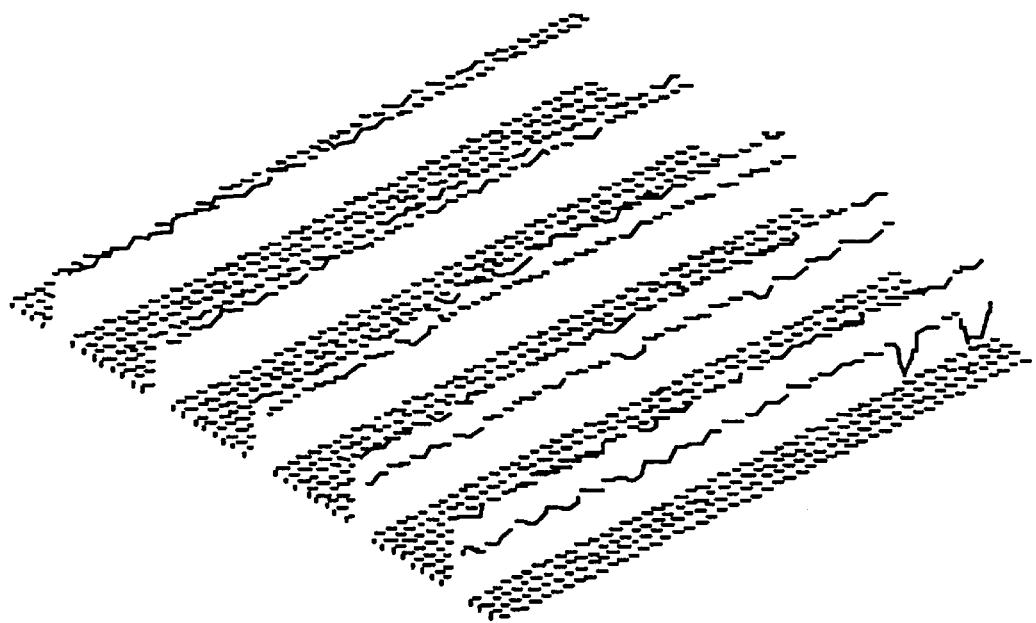
FIG. 18 shows a distribution of intensity of an image subjected only to edge enhancement processing.

A first embodiment of the invention will now be described below with reference to the drawings. FIG. 1A shows a line image for two pixels, and FIG. 1B shows intensity variation. When this image is converted into a binary form with a threshold (Th) as shown in FIG. 18, a change between white and block occurs at pixels of intensities immediately above and below the threshold, so that the binary image has jaggies at the edge. Although jaggies at the edge may occur in various forms, the jaggies occur independently of manners of binary conversion such as a threshold fixed binary conversion and an error diffusion method.

Figure 2:
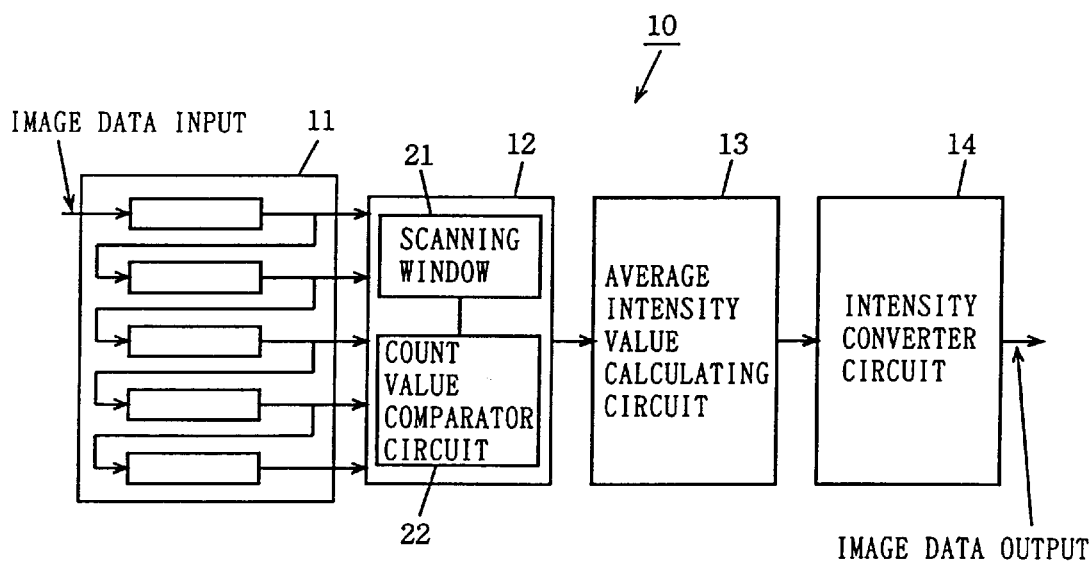
FIG. 2 is a block diagram showing a major portion of an image processing apparatus of a first embodiment.

Intensity correction by the image correction processing apparatus according to the invention will be described below. FIG. 2 is a block diagram showing a major portion of an image correction processing apparatus according to the invention. Referring to FIG. 2, image correction processing device 10 includes line memories 11 for storing image signals for 5 lines which are delayed by one line from each other, a line image detecting circuit 12 for detecting a line image based on data for 5 lines, an average intensity value calculating circuit 13 for calculating an average value of intensities of a line image portion if the line image is detected, and an intensity converter circuit 14 connected to average intensity value calculating circuit 13 for converting the intensity value of the target pixel into the average intensity value.

First, the image signals for five lines, which are delayed by one line from each other, are obtained from the input image signals by the continuously connected five line memories 11. These image signals are multilevel image signals which are subjected to edge enhancement by MTF correction or the like. From the data for five lines thus obtained, line image detecting circuit 12 detects the line image with a window of 5×5 pixels.

When the line image is detected, average intensity value calculating circuit 13 calculates the average value of the intensities of the detected line image portion, and intensity converter circuit 14 converts the target pixel intensity value into the average intensity value. When the line image is not detected, the conversion of the target pixel intensity value is not performed.

Figure 3:
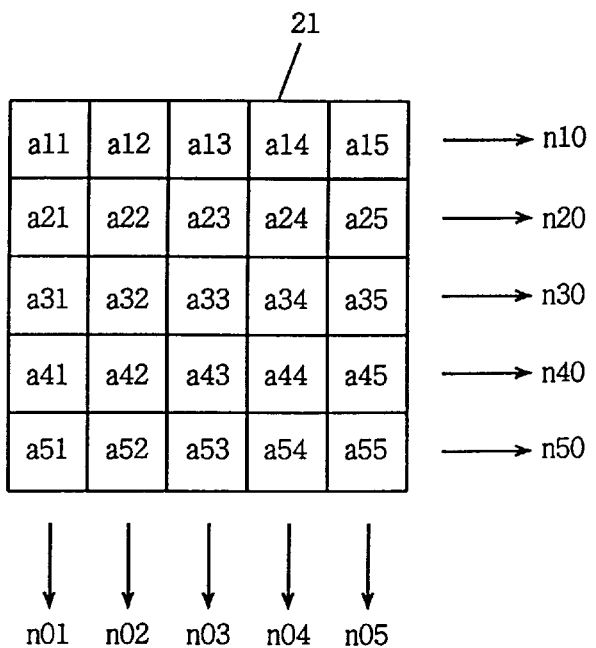
FIG. 3 shows a scanning window.
Figure 6A:
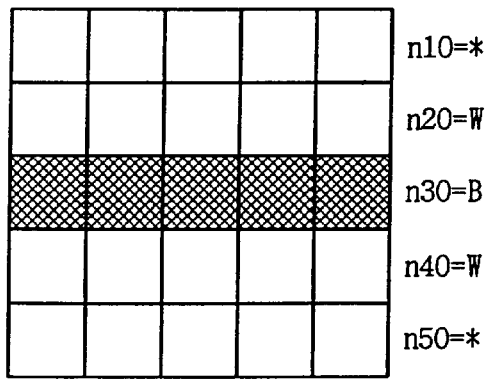
FIGS. 6A to 6E show examples of line images in the scanning window.
Figure 6B:
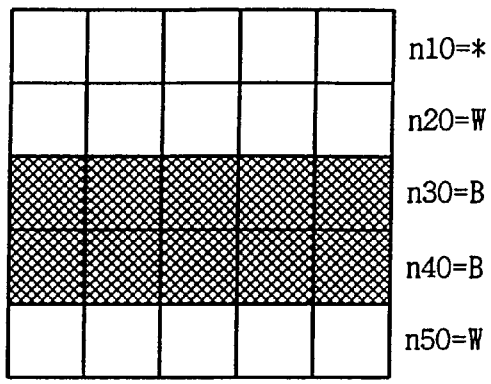
Figure 6C:
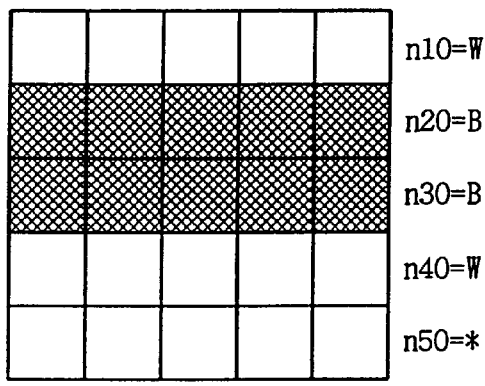
Figure 6D:
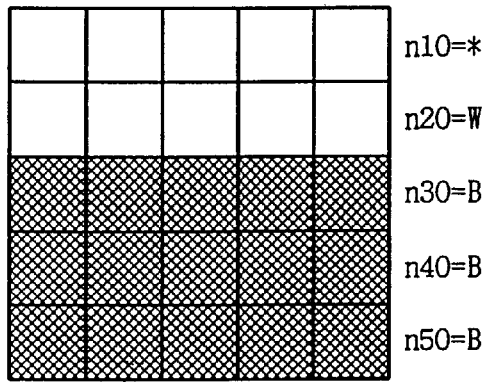
Figure 6E:
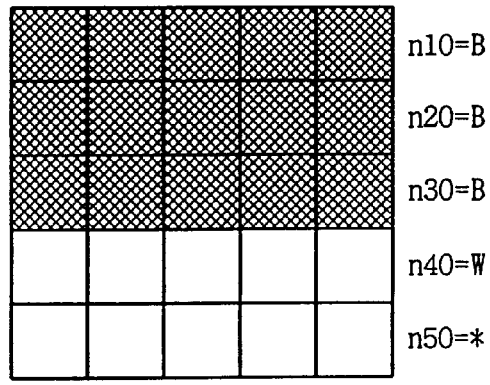

Description will now be given on detection of a line image edge by line image detecting circuit 12 shown in FIG. 2 with reference to FIG. 3. FIG. 3 shows a scanning window 21 forming line image detecting circuit 12. First, image data a(ij) (i, j=1, 2, 3, 4, 5) of 5×5 pixels is obtained from the image signals for five lines already subjected to the edge enhancement processing. The target pixel is represented by a33. Based on the pixel data, an operation is performed to count the numbers of pixel(s) of the intensity in a predetermined range in the row and column directions of the scanning window. It is assumed that the count values are represented by n10–n50 and n01–n05. This predetermined intensity range is determined to allow counting of the number of pixels at the background level in the input image data. If the input image data is, for example, a 256-level data, the ground level range is set to be from 0 to 15 for counting the number of pixels contained in this range.

FIG. 4 shows a specific example of image data taken into scanning window 21. Referring to FIG. 4, count values n of pixels in the predetermined intensity range (0–15) are shown in a matrix form. In order to detect line images from the arrangement of pixels in scanning window 21 based on these count values, this embodiment employs such a setting that only the line, of which counting shows the count value n of 0 or 1, is deemed as a line image and others are deemed as a background. According to this setting, the image in FIG. 4 is detected as line images shown in FIG. 5. More specifically, hatched portions in FIG. 5 are determined as line images.

Description will now be given on a count value comparator circuit 22 included in line image detecting circuit 12. Count value comparator circuit 22 makes a comparison between a count value table and actual count values. FIGS. 6A to 6E and FIGS. 7A to 7C show examples in which line images are detected in the aforementioned manner. Intensity converter circuit 14 at the downstream stage performs conversion of the target pixel intensity values. In connection with this, the target pixels must always be contained at edges of line images in order to perform the intensity correction of image edges, which is a purpose of this processing, by pipeline processing.

Figure 7A:
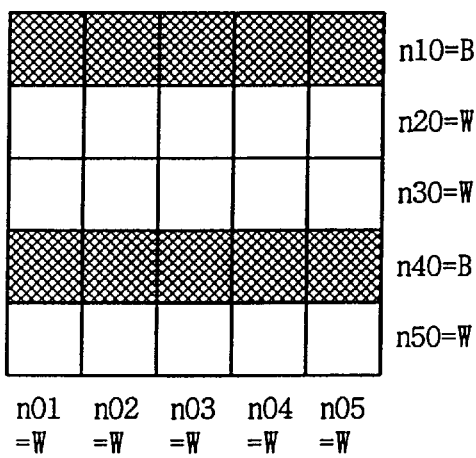
FIGS. 7A to 7C show examples of line images in the scanning window.
Figure 7B:
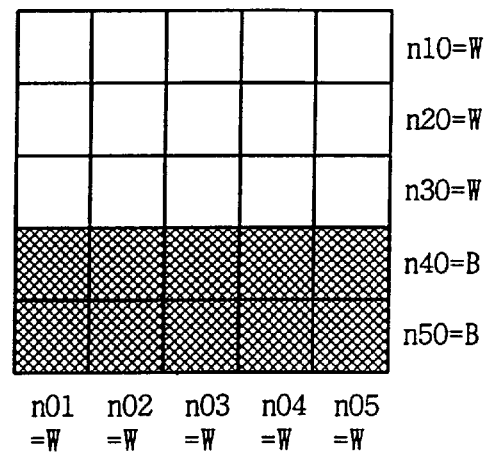
Figure 7C:
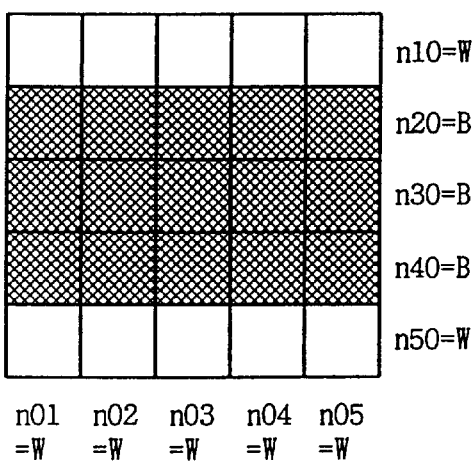

In the cases shown in FIGS. 7A to 7C, line images are detected in scanning window 21, but the target pixels are not present on the line image edges. For excluding these cases and thereby performing accurately the intensity conversion, a count value table for comparison which will be described later is prepared. Also, the intensity conversion is allowed only when a match occurs between the count value table for comparison and the actual count value. According to this count value table, the count value n of 0 or 1 represents B (line image), and the other values represent W (background). In the various figures, "*" means that the type (i.e., B or W) is not specified. In the example shown in FIG. 6A, therefore, a line image of one line can be detected regardless of whether a line image is present at lines of n10 and n50 (uppermost row in the count value table), because the line of n30 forms the line image, and the lines of n20 and n40 form the background.

The following table 1 represents count value table 22 for comparison.

TABLE 1

| | A | B | C | D | E |
|---|---|---|---|---|---|
| Row Direction Count Value Table | | | | | |
| n10 | * | * | W | * | B |
| n20 | W | W | B | W | B |
| n30 | B | B | B | B | B |
| n40 | W | B | W | B | W |
| n50 | * | W | * | B | * |
| Column Direction Count Value Table | | | | | |
| n01 | * | * | W | * | B |
| n02 | W | W | B | W | B |
| n03 | B | B | B | B | B |
| n04 | W | B | W | B | W |
| n05 | * | W | * | B | * |

FIGS. 6A to 6E show line images in the row direction which are detected because they exhibit a match with count value table 22 for comparison. Similar images are also found in the column direction. In any case, the target pixel is contained in the edge of the line image.

Figure 8:
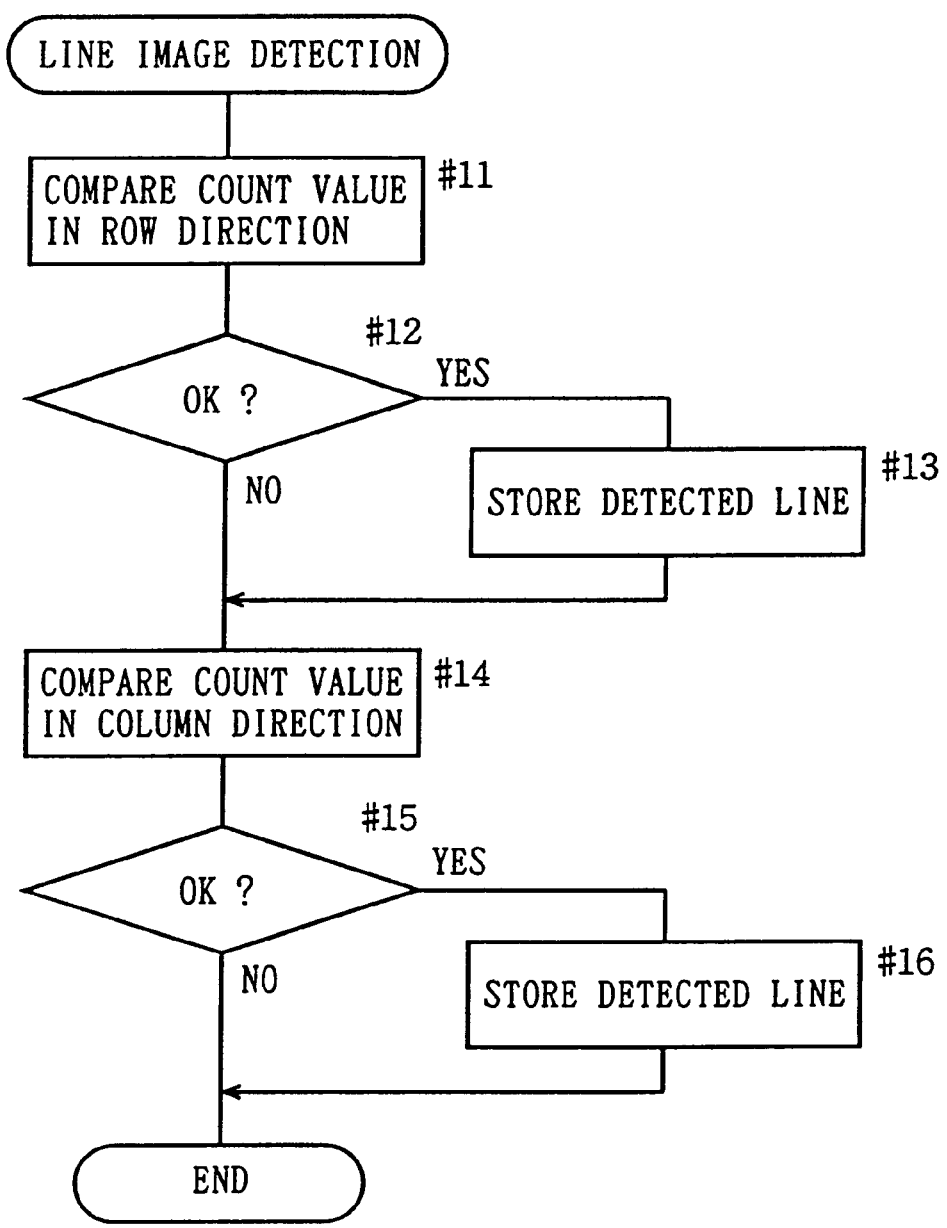
FIG. 8 is a flowchart showing the contents of line image detection processing.
Figure 9A:
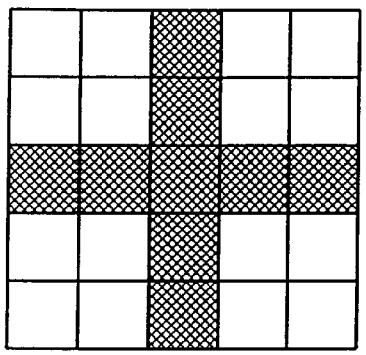
FIGS. 9A and 9B show examples of line images in the scanning window.
Figure 9B:
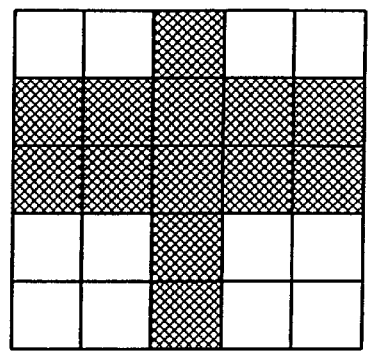

FIG. 8 is a flowchart showing an operation of line image detecting circuit 12 described above. Referring to FIG. 8, comparison of the count values for the row direction in scanning window 21 is performed (#11). When a match is found (YES at #12), the line, which is detected for calculating the average intensity at the next stage as will be described later, is stored (#13). Thereafter, comparison is performed in connection with the column direction (#14), and similar processing is performed (#15 and #16). FIGS. 9A and 9B show examples of line images which are detected in the row and column directions as described above.

Figure 10:
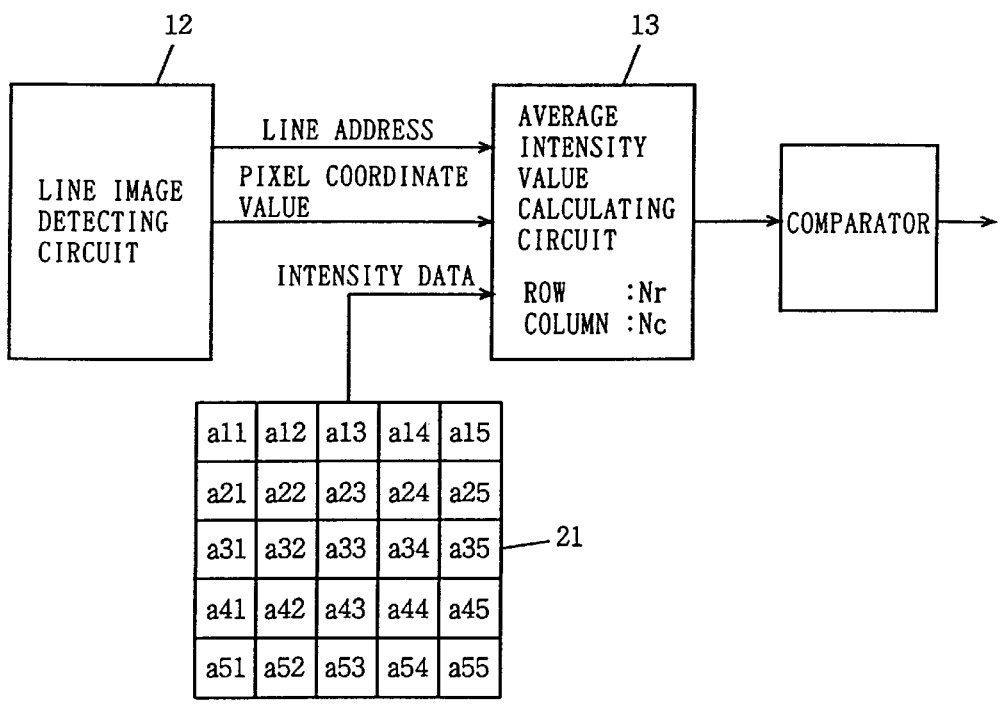
FIG. 10 is a block diagram showing a major portion of an average intensity value calculating circuit.

FIG. 10 is a block diagram showing a schematic structure relating to the average intensity value calculating circuit. Referring to FIG. 10, the calculation of the average intensity is performed by calculating the average intensity of the line images detected based on the intensity data which are obtained from the line address obtained from the result of line image detection by line image detecting circuit 12 (lines determined as the line image), coordinate values (coordinate values of pixels forming the line images) and the intensity data obtained from scanning window 21. The average intensity values are calculated in the row and column directions Nr and Nc independently of each other. For the direction in which the line image is not detected, the average intensity value is 0. If neither Nr nor Nc are 0 (if line images in both the directions are detected), magnitudes of Nr and Nr are compared, and the larger one is handled as output data to intensity converter circuit 14. Owing to this manner, the intensity value in the case where the line images cross each other does not lower, and blurring at the crossing point can be prevented.

In the example shown in FIG. 9B, the lines of n20 and n30 are detected as the line images in the row direction as a result of the line image detection, and the line of n03 is detected as the line image in the column direction. Nr is obtained from the intensity data for 10 pixels in total forming the lines of n20 and n30. Nc is obtained from the intensity data for 5 pixels in total forming the line of n03.

Figure 11:
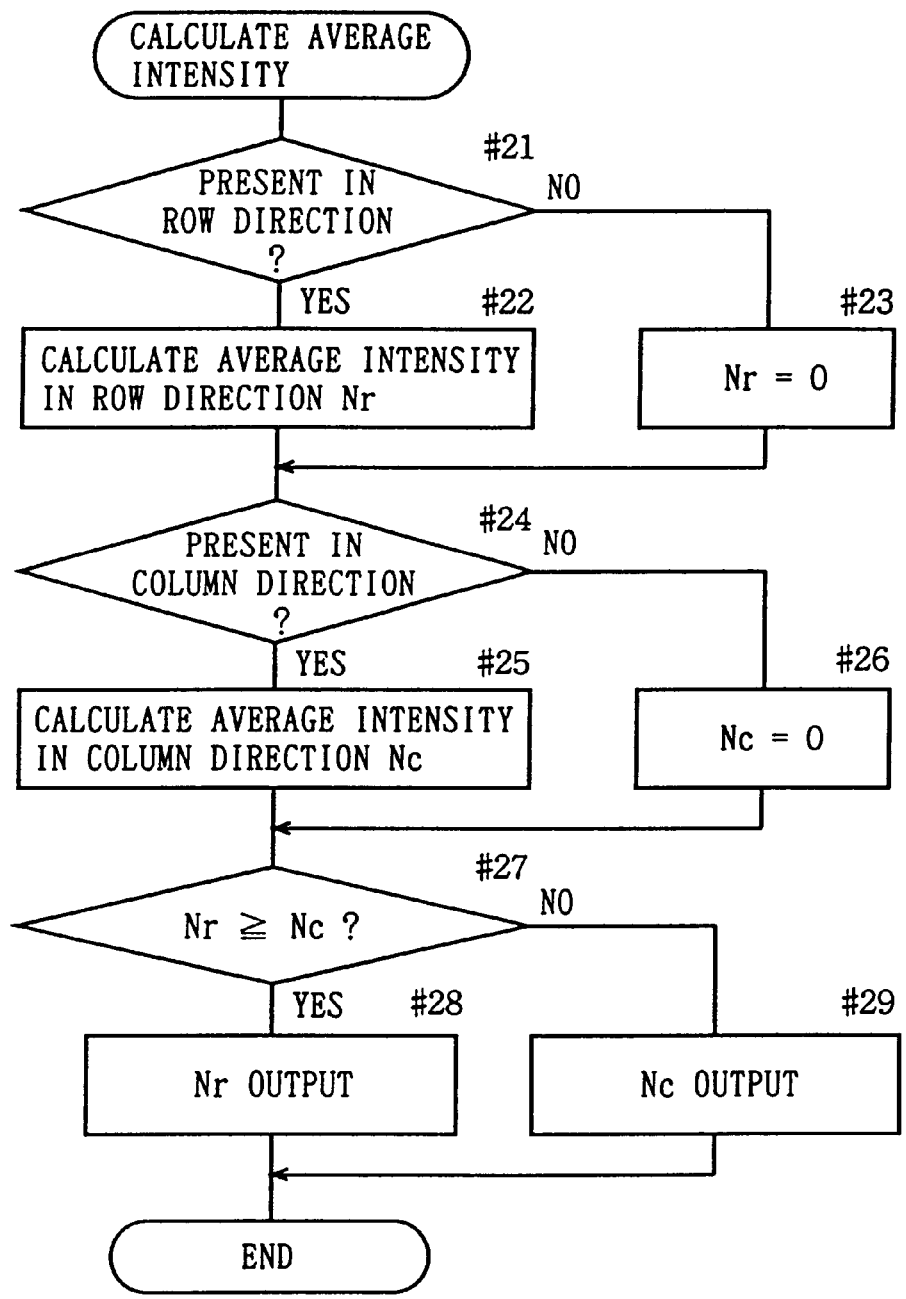
FIG. 11 is a flowchart showing the contents of average intensity calculation processing.

FIG. 11 is a flowchart showing an operation of average intensity value calculating circuit 13. Referring to FIG. 11, it is determined whether the line image is present in the row direction or not (#21). If the line image is present in the row direction, the average intensity in the row direction is calculated as Nr (#22). If not, Nr is set to 0 (#23). For the column direction, similar detection is performed for calculating the average intensity in the column direction (#24 and #25). If not detected in the column direction, Nc is set to 0 (#26).

Then, the intensities in the row and column directions are compared with each other, and a larger intensity data is output (#27–#29).

Intensity converter circuit 15 converts the target pixel intensity value to 0 only when the aforementioned average intensity value calculating circuit 13 issues the output data other than 0. When average intensity value calculating circuit 13 issues data of 0, conversion of the target pixel intensity value is not performed.

By the intensity correction of the line image edge described above, the intensity values of the edge are changed into a uniform value, so that it is possible to prevent jaggies which may occur due to multilevel-to-binary conversion.

(2) Second Embodiment

A second embodiment of the invention will be described below. In the second embodiment, the image intensity correction processing described in the first embodiment additionally has a function of removing an isolated pixel near a line image.

Figure 12:
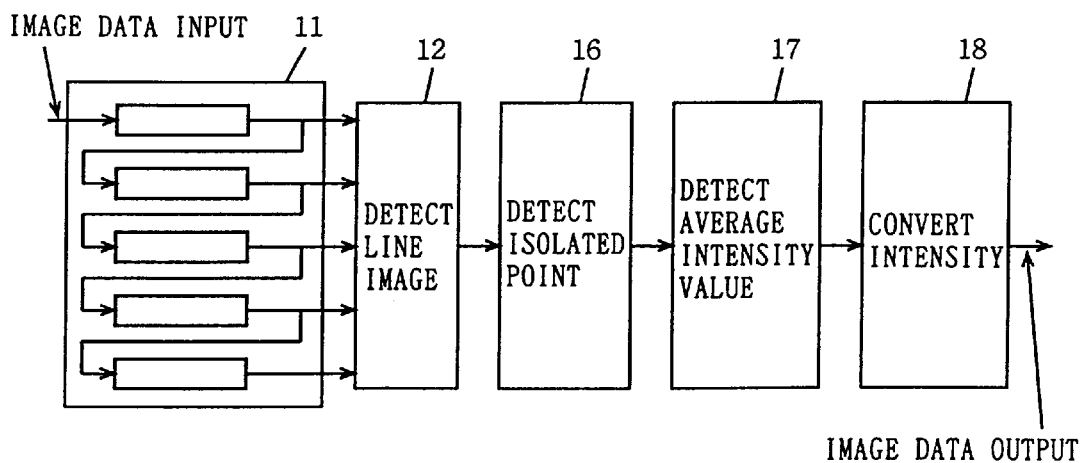
FIG. 12 is a block diagram showing a major portion of an image processing apparatus of a second embodiment.

FIG. 12 is a block diagram showing a major portion of an image correction processing apparatus of a second embodiment. Referring to FIG. 12, the image correction processing apparatus according to the second embodiment includes line memories 11, line image detecting circuit 12, an isolated point detecting circuit 16, an average intensity value calculating circuit 17 and an intensity converter circuit 18. Capturing of the image data, detection of the line images and calculation of the average intensity value are performed in a manner similar to that in the first embodiment.

Figure 13:
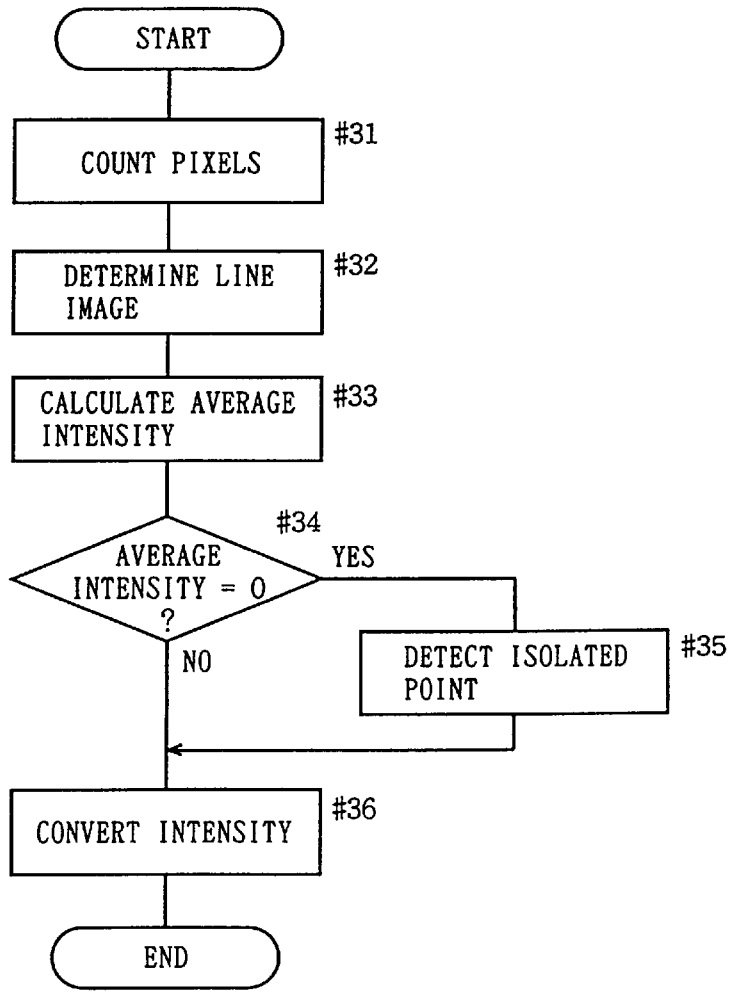
FIG. 13 is a flowchart showing an operation of the image processing apparatus of the second embodiment.

FIG. 13 is a flowchart showing an operation of the image correction processing apparatus of the second embodiment. Referring to FIGS. 12 and 13, capturing of the image data, determination of the line image and calculation of the average intensity value are performed (#31–#33). Only when the output result of average intensity value calculating circuit 17 is 0, an operation for detecting an isolated point is performed (#34 and #35). When the isolated point is detected, an intensity value of 0 is issued to intensity converter circuit 18 (#36). The isolated pixel in the above and following descriptions is a pixel which neighbors to a line image edge and causes jaggies at the line image as indicated by arrows in FIGS. 14A and 14B.

Figure 14A:
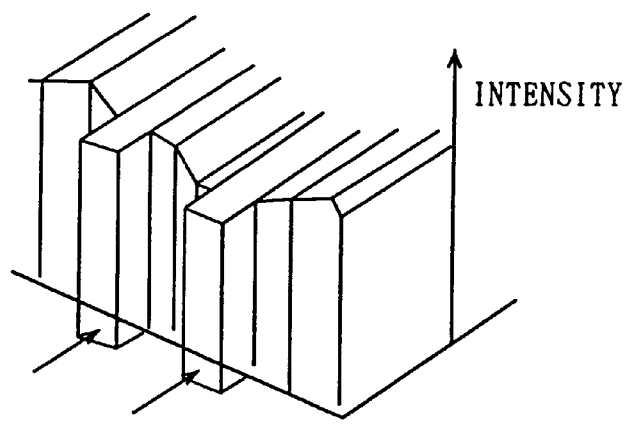
FIGS. 14A and 14B are diagrams showing isolated pixels neighboring to a line image.
Figure 14B:
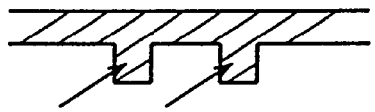

FIG. 14A is a diagram showing an intensity distribution at an image edge, and FIG. 14B shows actual image data.

Next, a method of determining the isolated pixel will be described below. Determination of the isolated pixel is performed similarly to the determination of the line image already described, and more specifically is performed by counting the number of pixels in scanning window 21 and comparing the result with a count value table for detection of isolated points. A predetermined intensity range for the counting may be equal to that for line image determination. However, in scanning window 21 of a 5×5 size, reference is made to 3×3 pixels including the target pixel at the center. Also, a count value table different from that for image line determination is employed. In this embodiment, it is determined that the target pixel is isolated if the comparison result shows a match in either the row or column direction.

The following table 2 is a count value table for detection of an isolated point. In this count value table, K represents that two pixels having intensities in a predetermined range are present in a center line (n20, n02) at the matrix in the scanning window, and in other words that one pixel is present at the center line as a pixel other than the background.

TABLE 2

| | A | B |
|---|---|---|
| Count Value Table for Detecting Isolated Points in Row Direction | | |
| n20 | W | B |
| n30 | K | K |
| n40 | B | W |
| Count Value Table for Detecting Isolated Points in Column Direction | | |
| n02 | W | B |
| n03 | K | K |
| n04 | B | W |
| however, | | |
| n | | K |
| 1 | | W |
| 2 | | B |
| 3 | | W |

Figure 15:
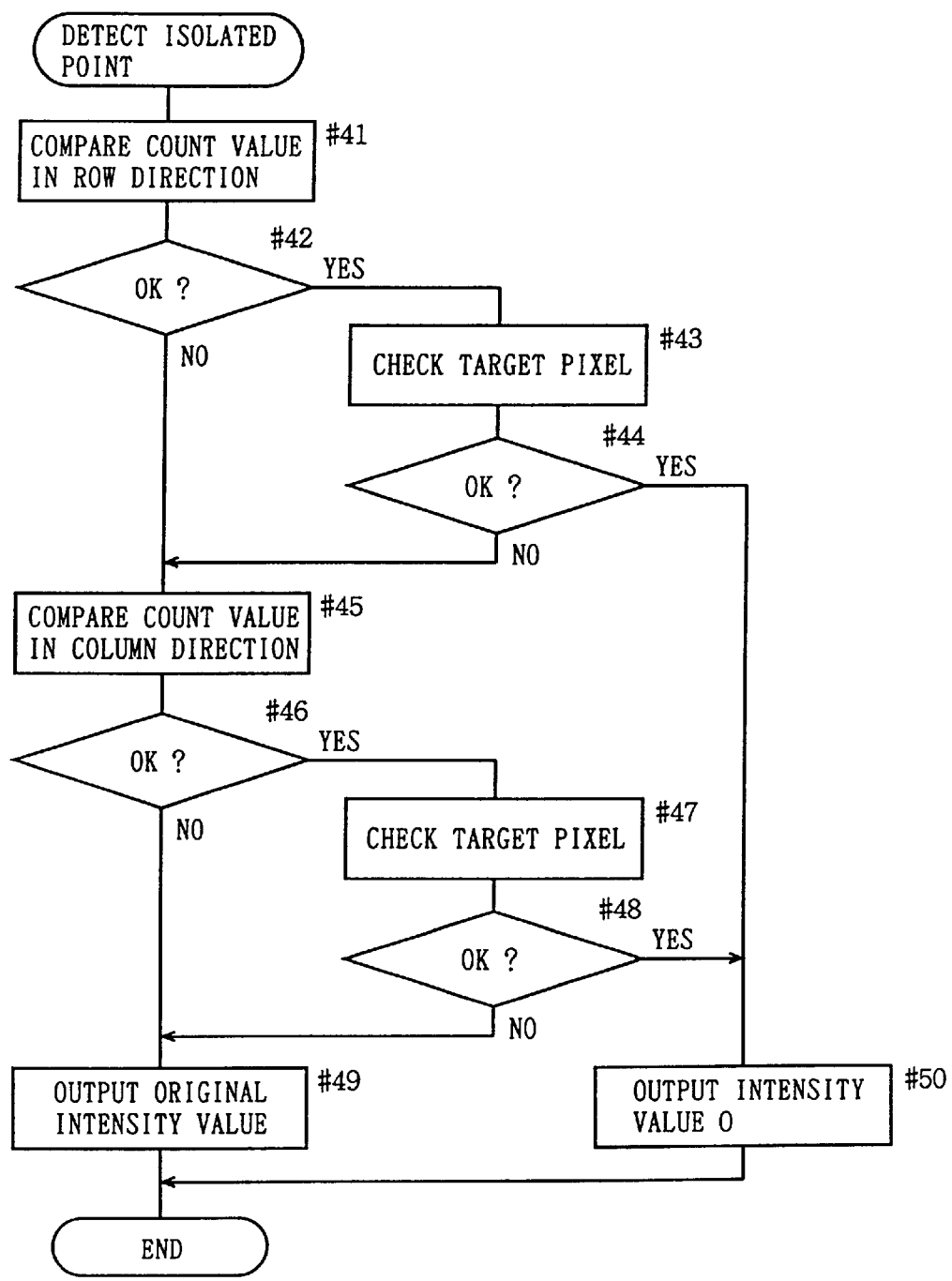
FIG. 15 is a flowchart showing the contents of isolated point detection processing.

FIG. 15 is a flowchart showing contents of processing for detecting isolated points. Referring to FIG. 15, comparison of count values is performed in connection with the row direction in scanning window 21 (#41). When a match is found (YES at #42), it is checked whether the target pixel is the isolated pixel (#43). If the target pixel is the isolated pixel (YES at #44), the intensity value of 0 is issued as output data (#50).

After completion of checking in the row direction, similar comparison of the count values is performed in the column direction (#45). If a match is found (YES at #46), it is checked whether the target pixel is the isolated pixel or not (#47). If the target pixel is the isolated pixel (YES at #48), the intensity value of 0 is issued as output data (#50). If not, or if a match with data in the isolated point determining window does not occur in the column direction, the original intensity value is issued (#49). A description will be given more specifically in the following.

Figure 16A:
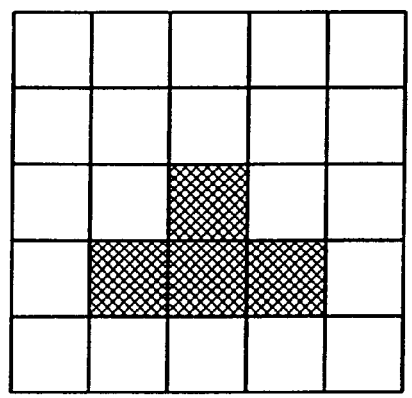
FIGS. 16A and 16B show examples of pixels in the scanning window during the isolated point detection processing.
Figure 16B:
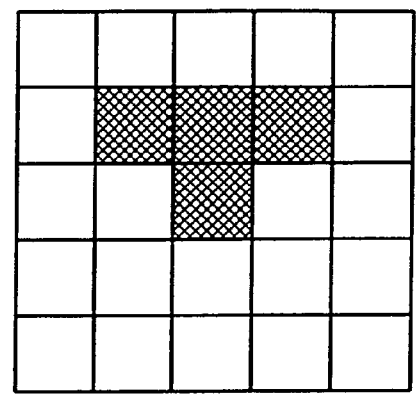
Figure 17:
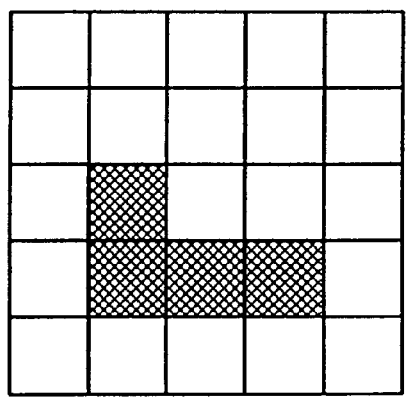
FIG. 17 shows an example of a pixel in the scanning window during the isolated point detection processing.

FIGS. 16A, 16B and 17 show examples of pixels in scanning window 21 during processing of detecting isolated points. FIGS. 16A and 16B relate to the row direction in the case where a match is found as a result of comparison with the count value table. FIG. 17 relates to the case where a match is found as a result of comparison with the count value table similarly to the case shown in FIGS. 16A and 16B, but the target pixel is not the isolated pixel. In the processing of determining isolated points, it is checked whether the target pixel is the isolated pixel or not after the comparison of the count values as shown in the flowchart of FIG. 15. More specifically, it is determined whether the intensity value of the target pixel is outside the predetermined intensity range (0–15 in 256-levels) or not. If it is outside, it is determined that the target pixel is the isolated pixel, and the intensity value of 0 is issued to intensity converter circuit 18 at the downstream stage. If the isolated pixel is not detected, conversion of the intensity is not performed because the original input intensity value is issued.

Intensity converter circuit 18 converts the intensity value of the target pixel into the average intensity value issued from average intensity value calculating circuit 17 or the intensity value of 0 issued from isolated point determining circuit 16. Intensity converter circuit 18 does not perform conversion when the original input intensity value is issued.

Figure 19:
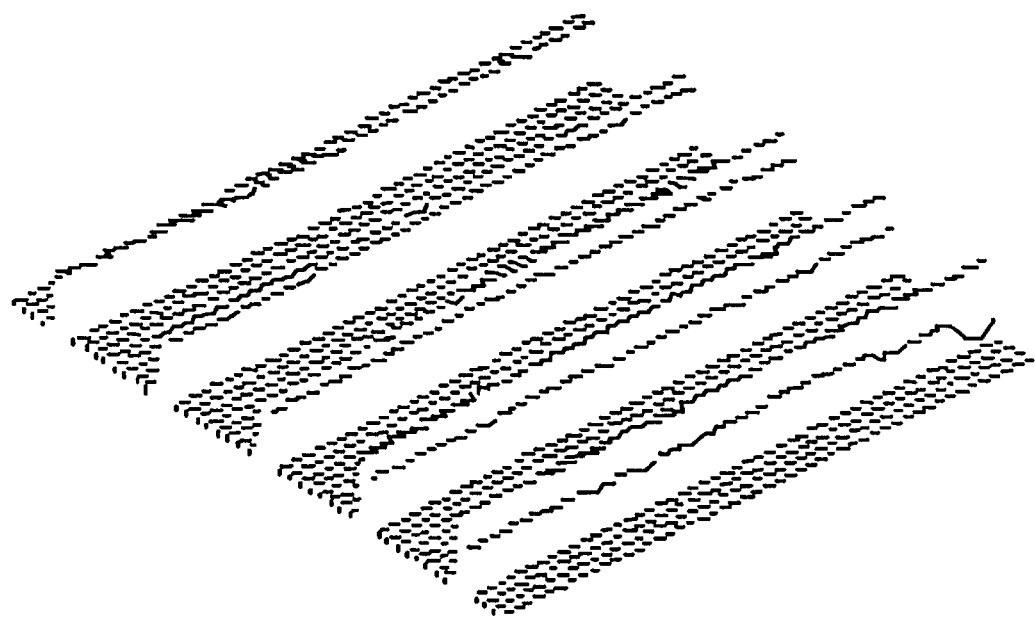
FIG. 19 shows a distribution of intensity of an image subjected to image correction processing after the edge enhancement processing.
Figure 20:
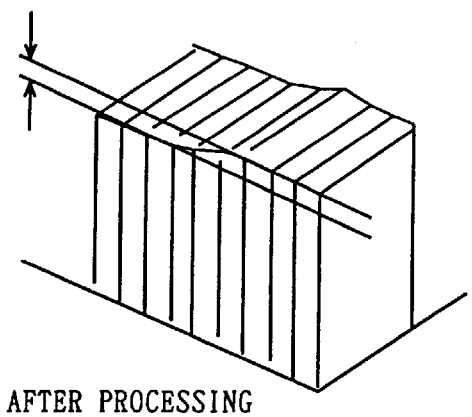
FIG. 20 is a diagram showing intensity distributions at an image edge before and after edge enhancement processing.
Figure 21A:
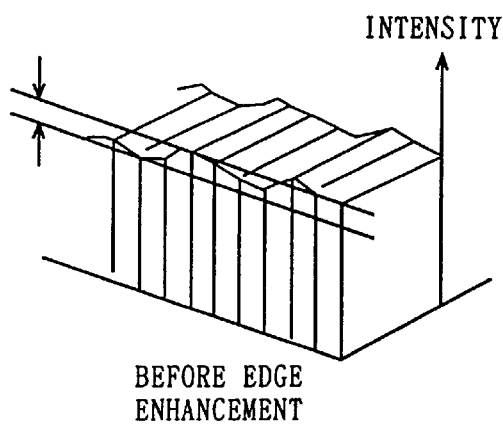
FIGS. 21A and 21B are diagrams showing intensity distributions at an image edge before and after edge enhancement processing in the prior art.
Figure 21B:
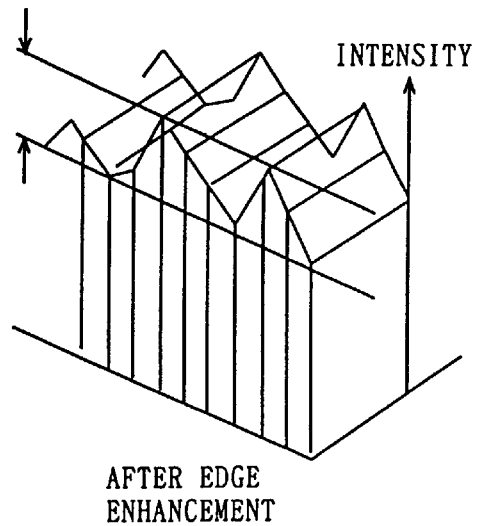

FIGS. 18 to 20 show an effect of the invention. FIG. 18 shows an intensity distribution of an image subjected only to the edge enhancing processing. FIG. 19 shows an image intensity distribution at the edge subjected to the image correction processing according to the invention after the edge enhancement processing. FIG. 20 is a diagram showing an intensity distribution at the image edge subjected to the processing according to the invention. Referring to FIGS. 18 to 20, the intensity varies slowly in the longitudinal direction of the edge, whereby the effect of the correction processing according to the invention can be confirmed.

(3) Third Embodiment

Figure 22:
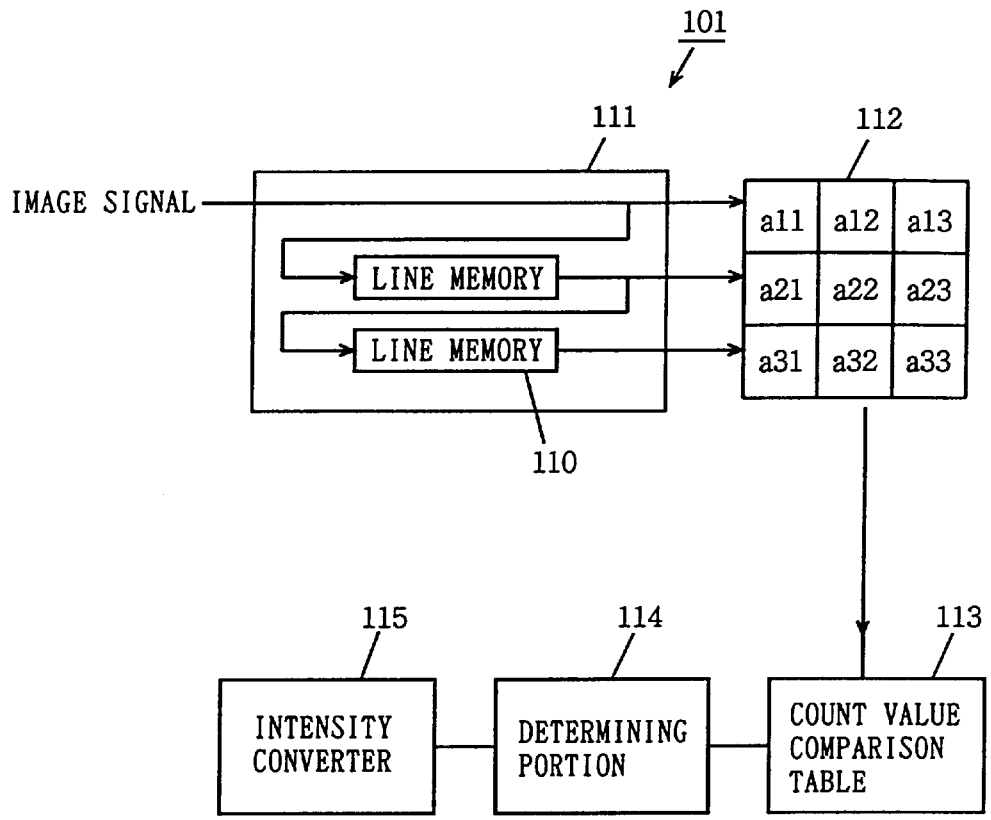
FIG. 22 is a block diagram showing a major portion of an image processing apparatus of a third embodiment of the invention.

A third embodiment of the invention will be described below with reference to the drawings. FIG. 22 is a block diagram showing a major portion of an image processing apparatus of the third embodiment of the invention. Referring to FIG. 22, an image processing apparatus 101 of the third embodiment includes an image signal input portion 111 for obtaining image signals for three lines, which are delayed by one line from each other, from input image signals, a scanning window 112 connected to image signal input portion 111 for holding image data of 3 pixels at a time in the row direction, a count value comparison table 113 connected to scanning window 112 for holding preset count values, a determining portion 114 connected to count value comparison table 113 for determining whether the target pixel is on a contour image or not, and an intensity converter portion 115 for performing conversion of the intensity of the target pixel in accordance with a result of determination.

Image signal input portion 111 includes continuously connected two line memories 110, which obtain the image signals for three lines delayed by one line from each other. The input image signal may be either a binary signal or a multilevel signal. Scanning window 112 is formed of 3×3 pixels including the target pixel at the center. The number of pixels of intensities, which are within a predetermined intensity ranges in both the row and column directions, is counted. Comparison is made between the results of counting in scanning window 112 and the preset count values in count value comparison table 113. In determining portion 114, it is determined, based on the comparison with count value comparison table 113, whether the target pixel is on the contour image or not. Intensity converter portion 115 performs conversion of the target pixel intensity when it is determined that the target pixel is on the contour image based on the comparison result, and thereby the contour image is obtained.

Figure 23:
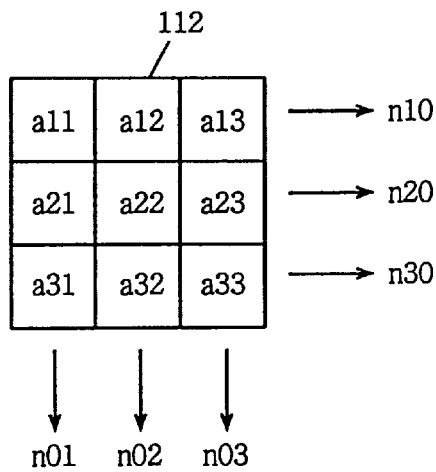
FIG. 23 shows a structure of a scanning window in the third embodiment of the invention.

Referring to FIG. 23, detection of the line image will now be described more specifically. FIG. 23 specifically shows scanning window 112. First, image data a(ij) (i, j=1, 2, 3) of 3×3 pixels is obtained from the input image signals for three lines. The target pixel is represented by a22. Based on the pixel data, an operation is performed to count the number of pixel(s) of the intensity in a predetermined range in the row and column directions or components of scanning window 112.

When the input image data is binary, the predetermined intensity is set to 0. When it is multilevel data, the predetermined intensity range is set to a range from 0 to 15. The counted numbers are set to n10–n30 and n01–n03 as shown in FIG. 23.

The above intensity range is determined to allow counting of the number of pixels at the background level in the input image data. This count value takes a value from 0 to 3 when scanning window size 112 has a 3×3 size. The value of 3 represents that the intensities of all the counted pixels in the row or column direction are in the predetermined intensity range (background level). The value of 0 represents that the pixel belongs to an image other than the background image. The value of 1 represents that two of three pixels belong to an image other than the background. The value of 2 represents that one of three pixels belong to an image other than the background. In the image processing apparatus of this embodiment, it is determined that the pixel belongs to a line image when the count value is 0 or 1. In other words, if the count value is 0 or 1, it is determined that image data represents the line image formed of two or three pixels and includes 0 or 1 pixel at the background level. Thereby, the contour image can be efficiently output even if an interruption and/or a jaggy are present on the image edge. In the foregoing processing, it is detected whether a line image is present or not at each of three longitudinal lines and three lateral lines in scanning window 112 of the 3×3 size.

Figure 24:
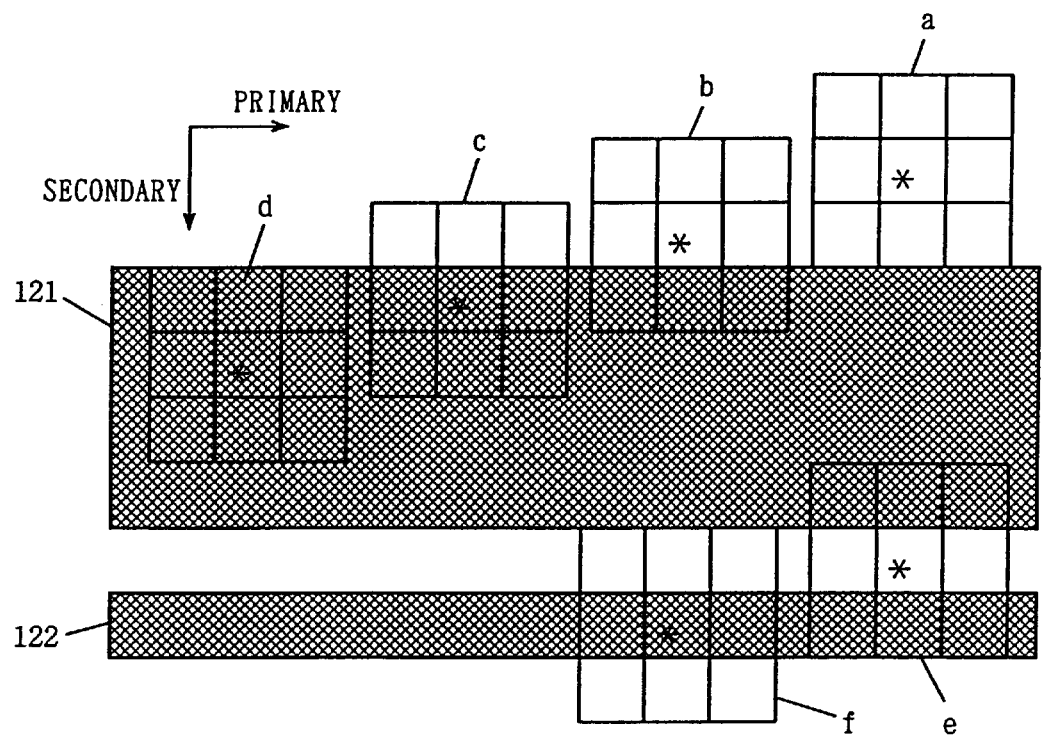
FIG. 24 shows a positional relationship between a line image and a scanning window.

A specific example will be described below with reference to FIG. 24, which is a diagram showing a relationship between a portion of a line (character) image and scanning window 112. Although this example shows only a lateral-line (character) image, the same is true with respect to a longitudinal-line image. It is assumed that scanning window 112 has relationships a to f in the figure with respect to line images 121 and 122.

In the case of relationship a, a line image is not detected in scanning window 112. In the cases of b and f, a line image of one line is detected in the row direction. In the cases of c and e, two lines in the row direction and three lines in the column direction are detected. In the case of d, a line image of three lines is detected in each of the row and column directions. In the figures, "*" represents the target pixel.

For outputting the contour image by pipeline processing, it is desired that the target pixel is detected on the contour image. Therefore, the relationships other than c and f do not satisfy the above desired situation, and therefore must be excluded (in c and f, target pixels are present on image edges). Accordingly, the following count value table is prepared, and count values in the scanning window are actually compared with this table for performing extraction only when it is determined, based on a match, that the target pixel is present on the image edge. In this count value table 3, B (image) represents the case where the count value n is 0 or 1, and W (background) represents the case where the count value n is 2 or 3.

TABLE 3

| Count Value Table for Detecting Isolated Points in Row Direction | | |
|---|---|---|
| n10 | n20 | n30 |
| W | B | W |
| W | B | B |
| B | B | W |
| Count Value Table for Detecting Isolated Points in Column Direction | | |
| n01 | n02 | n03 |
| W | B | W |
| W | B | B |
| B | B | W |

Figure 25:
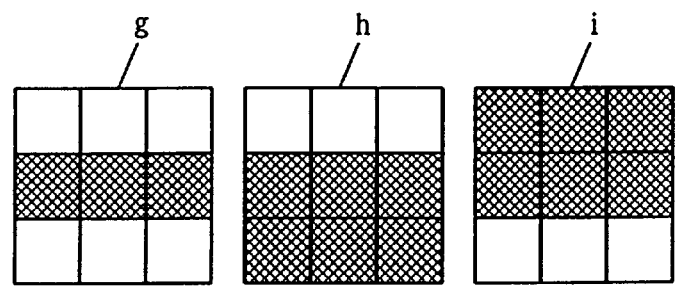
FIG. 25 shows a line image pattern matching with a count value table.

Line image patterns matching with the above count value table are shown at g, h and i in FIG. 25. Although FIG. 25 shows only examples in the row direction, similar patterns can be obtained in the column direction. In these examples, the count value n is 0 or 3. In the figure, g represents a line image having a width of one pixel, and h and i represent line images having widths of two or more pixels. In all the examples, the target pixels are present on edges of the line images.

Figure 26A:
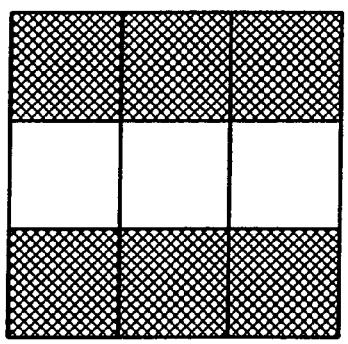
FIGS. 26A and 26B show line image patterns not matching with the count value table.
Figure 26B:
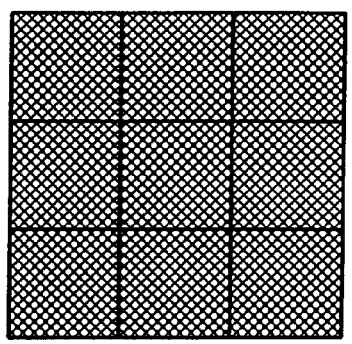

FIGS. 26A and 26B show examples of line image patterns not matching with the count value table. In these examples, line images are detected in scanning window 112 but the target pixels are not present on line image edges, so that this processing does not handle these examples as detection of a contour.

The above examples have been discussed only in connection with the row direction. Actual comparison with the count value table is performed in the row and column directions for determining whether the target pixel is on the image edge or not.

Figure 27:
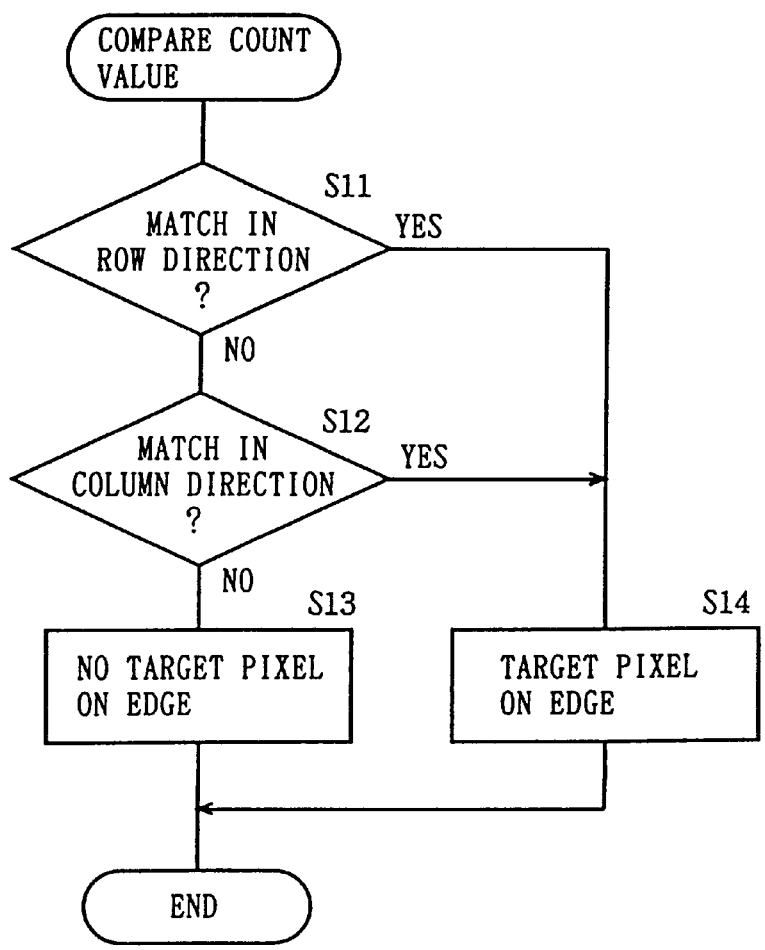
FIG. 27 is a flowchart showing processing of a count value comparator.

FIG. 27 is a flowchart showing steps for comparison of count values. Referring to FIG. 27, in the processing for comparison of count values, it is first determined whether a match is found in the row direction or not (step S11). If not, it is determined whether a match is found in the column direction or not (step S12). If a match is found in neither the row nor column directions, it is determined that the target pixel is not present on the edge (step S13). If there is a match in at least one of the row and column directions (YES at steps S11 and/or S12), it is determined that the target pixel is present on the edge (step S14).

As shown in FIG. 27, when a match is found in at least one of results of the count value comparison in the row and column direction, it is determined that the target pixel is present on the image edge. The order of check of the rows and columns is not restricted.

Figure 28:
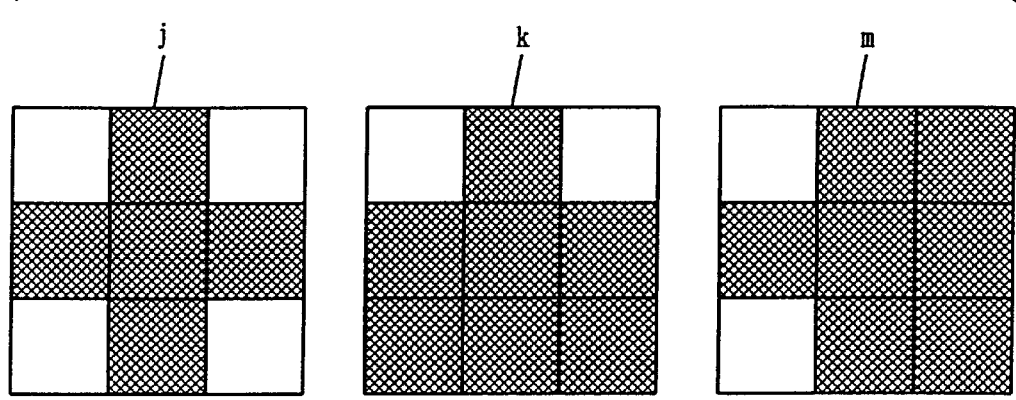
FIG. 28 shows an example in such a case that line images in row and column directions are detected in a scanning window, and a result by count value comparison exhibits a match.
Figure 29:
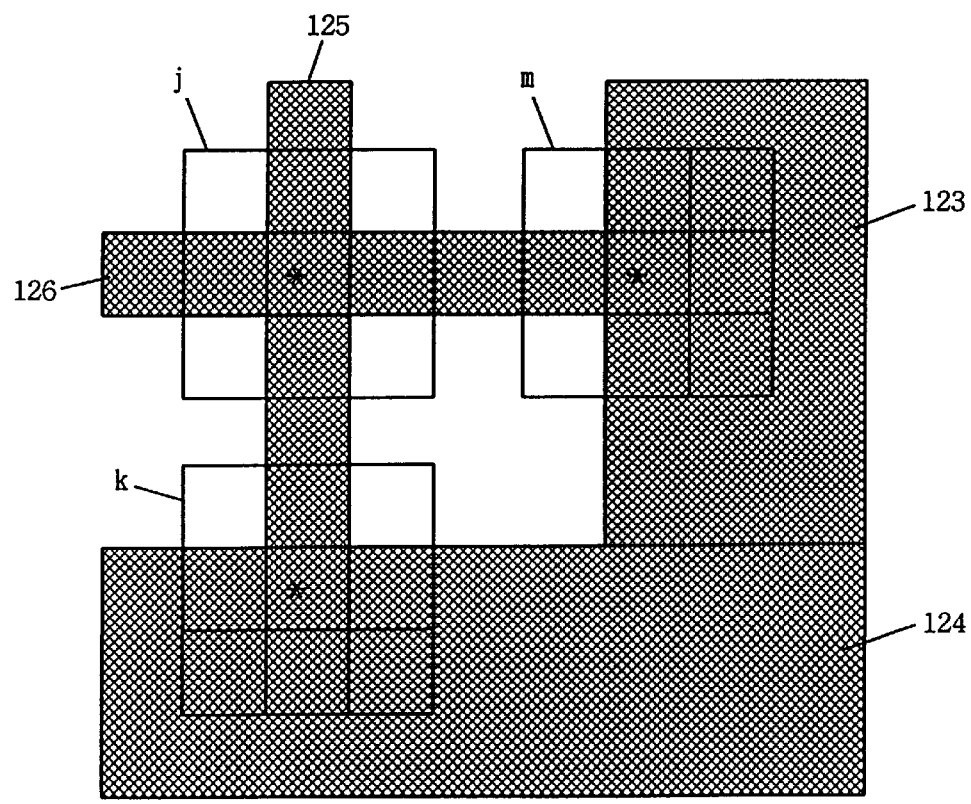
FIG. 29 shows a positional relationship between a scanning window and a line image.

FIGS. 28 and 29 are diagrams showing examples in the case where line images in the row and column directions are detected in scanning window 112 and a match is found from the result of comparison by the count value comparator. FIG. 28 shows contents in windows j, k and m at positions of line images 123–126 in FIG. 29, respectively.

Figure 30:
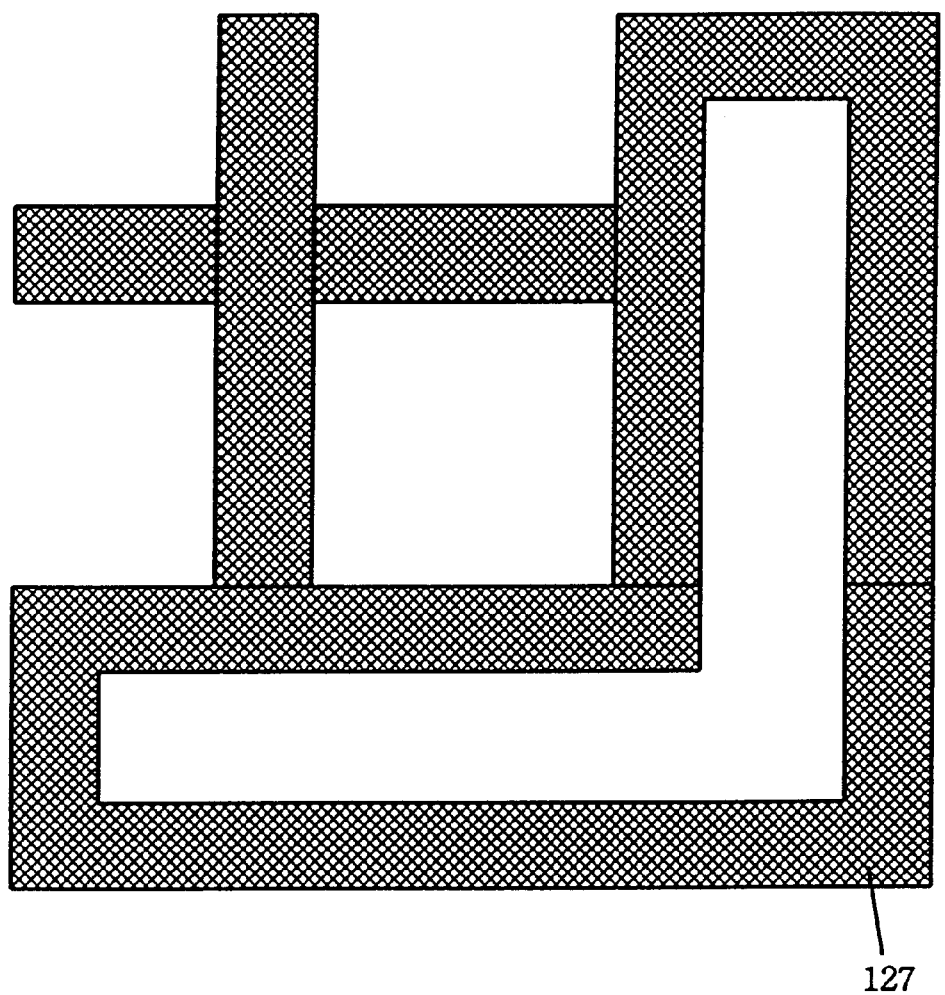
FIG. 30 shows an example of processing of the input image shown in FIG. 28.

If determining portion 114 determines from FIGS. 28 and 29 that the target pixels are present on image edges, intensity converter portion 115 converts the target pixel into a black pixel. If not, intensity converter portion 115 converts the target pixel into a white pixel. The image data thus obtained is shown in FIG. 30. As shown in the figure, black pixels are set only at portions where the target pixels are present on the image edges, and pixels at the other portions are converted into white pixels, so that the edge of image is clearly displayed. As a result, a clear contour image can be obtained.

The image processing apparatus according to the invention can be applied not only to a laser printer and a scanner but also to image display for a personal computer and image correction processing in a page memory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. An image processing apparatus comprising:
   an input device for inputting image data;
   a device for reading a portion of said image data corresponding to a scanning window, said scanning window including a plurality of pixel data which are arranged in rows and columns;
   a counting device for counting the numbers of predetermined pixels in the read image data individually in rows and columns;
   a count value setting device for setting predetermined count values for the rows and the columns;
   a count value comparing device for comparing a result of counting by said counting device with the set values of said count value setting device; and
   a converter for performing conversion of pixel data in the rows and columns based on a result of said comparison by said count value comparing device.
2. An image processing apparatus according to claim 1, wherein
   said input device continuously inputs image data, and said device for reading takes in a plurality of input image data in the row and column directions.
3. An image processing apparatus according to claim 1, wherein
   said counting device counts the number of the predetermined pixels in a predetermined intensity range.
4. An image processing apparatus according to claim 1, wherein
   said count value setting device sets the count values for the rows and columns, respectively, such that the predetermined target pixel is present on an edge of the image forming the image data, and
   said converting device converts the intensity of the target pixel into a predetermined intensity when a predetermined result of comparison is obtained.
5. An image processing apparatus according to claim 4, wherein
   said converting device converts the intensity of the target pixel into an intensity of a black pixel when a predetermined result of comparison is obtained, and
   converts the intensity of the target pixel into an intensity of a white pixel when the predetermined result of comparison is not obtained.

6. An image processing apparatus according to claim 5, wherein said input device continuously inputs the image data, and said device for reading takes in a plurality of input image data in the row and column directions.

7. An image processing apparatus according to claim 6, wherein said counting device counts the number of the predetermined pixels in a predetermined intensity range.

8. An image processing apparatus comprising:

a device for reading image data corresponding to a scanning window, said scanning window including a plurality of pixel data which are arranged in rows and columns;

a counting device for counting numbers of predetermined pixels in the rows and the columns of the read data;

a line image determining device for determining, based on a result of counting by said counting device, whether the pixel data in the scanning window forms a line image or not; and a converter for converting intensity data of the pixel data of said target pixel into a predetermined intensity based on a result of said determination by said line image determining device.

9. An image processing apparatus according to claim 8, further comprising an average intensity value calculating device for calculating an average intensity value from intensity values of a plurality of pixels forming a line image in the scanning window, wherein said predetermined intensity is said average intensity value.

10. An image processing apparatus according to claim 8, wherein said line image determining device includes:
a count value table for setting predetermined count values for the rows and columns in said scanning window, and
a comparator for comparing a result of counting by said counting device with the predetermined count values in said count value table;
wherein the result of said comparison by said comparator is used to determine whether the pixel data forms a line image or not.

11. An image processing apparatus according to claim 9, wherein said line image determining device determines, in both the row and column directions, whether the pixel data forms a line image or not,
said average intensity value calculating device calculates the average intensity value of each of the line images when said line image determining means determines presence of line images in both the row and column directions, and
said converter converts the intensity value of said target pixel into a larger one of the calculated average intensity values.

12. An image processing apparatus comprising:

a device for reading image data corresponding to a scanning window, said scanning window including a plurality of pixel data which are arranged in rows and columns;

a counting device for counting a number of predetermined pixels in the rows and the columns of the read image data;

a line image determining device for determining, based on a result of counting by said counting device, whether the pixel data in said scanning window forms a line image or not;

an isolated pixel determining device for determining whether said target pixel is an isolated pixel or not; and a converter for converting intensity data of the image data of the target pixel into a predetermined line image intensity when the target pixel is contained in a line image according to a result of said determination by said line image determining device, and converting the intensity data of the image data of the target pixel into a predetermined isolated point intensity when the target pixel is an isolated point according to a result of said determination by said isolated point pixel determining device.

13. An image processing apparatus according to claim 12, wherein the intensity data of the image data of the target pixel is converted into a predetermined intensity of a white pixel when the target pixel is the isolated point according to a result of said determination by said isolated point pixel determining device.

14. An image processing apparatus according to claim 12, further comprising:

an average intensity value calculating device for calculating an average intensity value from intensity values of a plurality of pixels forming a line image in the scanning window, wherein said predetermined line image intensity is said average intensity value.

15. An image processing apparatus according to claim 12, wherein said line image determining device includes:
a count value table for setting predetermined count values for the rows and columns in said scanning window, and
a comparator for comparing a result of counting by said counting device with a predetermined count value in said count value table;
wherein the result of said comparison by said comparator is used to determine whether the pixel data forms a line image or not.

16. An image processing apparatus according to claim 14, wherein said line image determining device determines, in both the row and column directions, whether the pixel data forms a line image or not,
when said line image determining device determines a presence of line images in both the row and column directions, said average intensity value calculating device calculates the average intensity value of each of the line images; and
said converter converts the intensity value of said target pixel into a larger one of the calculated average intensity values.

17. An image processing apparatus according to claim 12, wherein said isolated point determining device includes:
a count value table for setting predetermined count values for the rows and columns in said scanning window, and
a comparator for comparing a result of counting by said counting device with the predetermined count value in said count value table;
wherein the result of comparison by said comparator is used to determine whether the target pixel is an isolated point or not.

18. An image processing apparatus comprising:
- a device for reading image data corresponding to a scanning window, said scanning window including a plurality of pixel data which are arranged in rows and columns;
- a counting device for counting, for each of the rows and columns in the scanning window, the numbers of pixel data having a predetermined value;
- a line image determining device for determining, based on a result of counting by said counting device, whether the pixel data in the scanning window forms a line image or not; and
- a converter for converting intensity data of the pixel data of said target pixel into a predetermined intensity based on a result of said determination by said line image determining device.

19. An image processing apparatus comprising:
- a device for reading image data corresponding to a scanning window, said scanning window including a plurality of pixel data which are arranged in rows and columns;
- a counting device for counting, for each of the rows and columns in the scanning window, the numbers of pixel data having a predetermined value;
- a line image determining device for determining, based on a result of counting by said counting device, whether the pixel data in said scanning window forms a line image or not;
- an isolated pixel determining device for determining whether said target pixel is an isolated pixel or not; and
- a converter for converting intensity data of the image data of the target pixel into a predetermined line image intensity when the target pixel is contained in a line image according to a result of said determination by said line image determining device, and converting the intensity data of the image data of the target pixel into a predetermined isolated point intensity when the target pixel is an isolated point according to a result of said determination by said isolated point pixel determining device.

20. A method of processing image data comprising the steps of:
- inputting image data;
- reading a portion of said image data corresponding to a scanning window, said scanning window including a plurality of pixel data which are arranged in rows and columns;
- counting the numbers of predetermined pixels in the read image data individually in rows and columns;
- setting predetermined count values for the rows and the columns;
- comparing a result of counting by said counting step with the set values of said setting step; and
- performing conversion of pixel data in the rows and columns based on a result of said comparing step.

21. A method of processing image data according to claim 20, wherein
said counting step counts the number of the predetermined pixels in a predetermined intensity range.

22. A method of processing image data according to claim 20, wherein:
said setting step sets the count values for the rows and columns, respectively, such that the predetermined target pixel is present on an edge of the image forming the image data, and said converting step converts the intensity of the target pixel into a predetermined intensity when a predetermined result of comparison is obtained.

23. A method of processing image data according to claim 22, wherein
said converting step converts the intensity of the target pixel into an intensity of a black pixel when a predetermined result of comparison is obtained, and
converts the intensity of the target pixel into an intensity of a white pixel when the predetermined result of comparison is not obtained.

24. A method of processing image data comprising:
- reading image data corresponding to a scanning window, said scanning window including a plurality of pixel data which are arranged in rows and columns;
- counting numbers of predetermined pixels in the rows and the columns of the read data;
- determining, based on a result of counting by said counting step, whether the pixel data in the scanning window forms a line image or not; and
- converting intensity data of the pixel data of said target pixel into a predetermined intensity based on a result of said determination by said determining step.

25. A method of processing image data according to claim 24, further comprising a step of calculating an average intensity value from intensity values of a plurality of pixels forming a line image in the scanning window, wherein said predetermined intensity is said average intensity value.

26. A method of processing image data according to claim 25, wherein
said determining step determines, in both the row and column directions, whether the pixel data forms a line image or not,
said calculating step calculates the average intensity value of each of the line images when said determining step determines the presence of line images in both the row and column directions, and
said converting step converts the intensity value of said target pixel into a larger one of the calculated average intensity values.

27. A method of processing image data comprising:
- reading image data corresponding to a scanning window, said scanning window including a plurality of pixel data which are arranged in rows and columns;
- counting a number of predetermined pixels in the rows and the columns of the read image data;
- determining, based on a result of counting by said counting step, whether the pixel data in said scanning window forms a line image or not;
- determining whether said target pixel is an isolated pixel or not; and
- converting intensity data of the image data of the target pixel into a predetermined line image intensity when the target pixel is contained in a line image according to a result of said determination by said determining step, and converting the intensity data of the image data of the target pixel into a predetermined isolated point intensity when the target pixel is an isolated point according to a result of said determination by said isolated point pixel determining step.

28. A method of processing image data according to claim 27, wherein
the intensity data of the image data of the target pixel is converted into a predetermined intensity of a white pixel when the target pixel is the isolated point according to a result of said determination by said isolated point pixel determining step.

29. A method of processing image data according to claim 27, further comprising:

a step of calculating, when said target pixel is determined to be present in a line image, an average intensity value from intensity values of a plurality of pixels forming said line image in the scanning window, wherein said predetermined line image intensity is said average intensity value.

30. A method of processing image data according to claim 29, wherein said line image determining step determines, in both the row and column directions, whether the pixel data forms a line image or not and, when said line image determining step determines a presence of line images in both the row and column directions, said average intensity value calculating step calculates the average intensity value of each of the line images and said converting step converts the intensity value of said target pixel into a larger one of the calculated average intensity values.

* * * * *